(12) United States Patent
Alvarez et al.

(10) Patent No.: US 7,598,820 B2
(45) Date of Patent: Oct. 6, 2009

(54) MAGNETIC DRIVE FOR HIGH AND LOW TEMPERATURE MECHANICAL OSCILLATORS USED IN SENSOR APPLICATIONS

(75) Inventors: Manuel S. Alvarez, Warrenton, VA (US); Henry Alan Wolf, Morristown, NJ (US); Martin Mellert, Steinach (DE); Josef Fehrenbach, Hasiach (DE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 116 days.

(21) Appl. No.: 11/784,183

(22) Filed: Apr. 5, 2007

(65) Prior Publication Data

US 2008/0055013 A1    Mar. 6, 2008

(51) Int. Cl.
  *H03B 5/30*    (2006.01)
(52) U.S. Cl. .................................. 331/116 M; 331/114
(58) Field of Classification Search ................. 331/114, 331/116 R, 116 M
  See application file for complete search history.

(56) References Cited

U.S. PATENT DOCUMENTS

| | | | |
|---|---|---|---|
| 3,953,829 A | 4/1976 | Boyle | |
| 4,001,771 A | 1/1977 | Amrine et al. | |
| 6,986,650 B2 * | 1/2006 | West | 417/423.3 |
| 7,406,002 B2 | 7/2008 | Schleisiek et al. | |
| 2005/0068851 A1 | 3/2005 | Schleisiek et al. | |
| 2005/0100465 A1 * | 5/2005 | West | 417/448 |
| 2007/0236213 A1 * | 10/2007 | Paden et al. | 324/228 |

FOREIGN PATENT DOCUMENTS

| | | |
|---|---|---|
| CH | 651 663 A5 | 9/1985 |
| DD | 77827 | 11/1970 |
| DE | 556194 | 7/1932 |
| DE | 556194 A | 8/1932 |
| DE | 971326 | 1/1959 |
| DE | 77827 | 11/1970 |
| DE | 2220650 | 3/1973 |
| DE | 2852565 A1 | 10/1979 |
| DE | 103 44 558 A1 | 5/2005 |
| EP | 495275 A1 | 7/1992 |
| GB | 2022359 | 12/1979 |
| JP | 2008510997 T2 | 4/2008 |
| WO | WO 96/04645 | 2/1996 |
| WO | WO 2007/1130011 | 10/2007 |

* cited by examiner

*Primary Examiner*—Don P Le

(57) ABSTRACT

A magnetic drive and mechanical oscillator system comprising a mechanical oscillator, a coil, a means for providing alternating current to said coil thereby creating a magnetic field within and about the coil, said means including an on-off means and a ferromagnetic material in communication with the diaphragm of the mechanical oscillator and the coil.

13 Claims, 7 Drawing Sheets

MAGNETIC DRIVE FOR HIGH AND LOW TEMPERATURE MECHANICAL OSCILLATORS USED IN SENSOR APPLICATIONS

BACKGROUND OF THE INVENTION

The present invention relates to a drive for high and low temperature mechanical oscillators. In particular, the present invention relates to a magnetic drive for mechanical oscillators.

The present invention provides a reliable method and mechanically robust components to excite a mechanical oscillator to operate at high temperature to develop commercial sensor applications based on these devices. These devices have numerous applications including but not limited to: Level sensors; corrosion/erosion monitoring; density/viscosity measurements.

The current available sensors are driven by piezoelectric crystals that typically have low temperature Curie points. The piezoelectric crystal Curie point limits the device operating temperature. In addition, the devices have variable performance depending on temperature cycles due to mechanical changes in the mounting that occur during thermal expansion. Further, the piezoelectric technology is based mostly on ceramic materials that can crack and may be difficult to make electrical connections that survive temperature cycling and/or high temperature. Inductively driven tuning fork resonator devices of the present invention may operate at high temperature, substantially reducing the limitations associated with piezoelectric crystal drivers.

SUMMARY OF THE INVENTION

The present invention is a magnetic drive for mechanical oscillator systems. The systems include a mechanical oscillator, and driving elements comprising a coil with an optional core, a means for providing current to the coil, and a ferromagnetic material. All of the elements are in communication with each other directly or through one of the other elements. The means for providing current to the coil includes an on-off switch so that when no current is flowing, the coil is unused or may operate as a passive receiver.

In a preferred embodiment, a permanent magnet replaces at least some of the ferromagnetic material and is fixed to the mechanical oscillator. The Curie point of these materials should be higher than the service temperature.

DETAILED DESCRIPTION OF THE PREFERRED EMBODIMENTS

Figure 1:
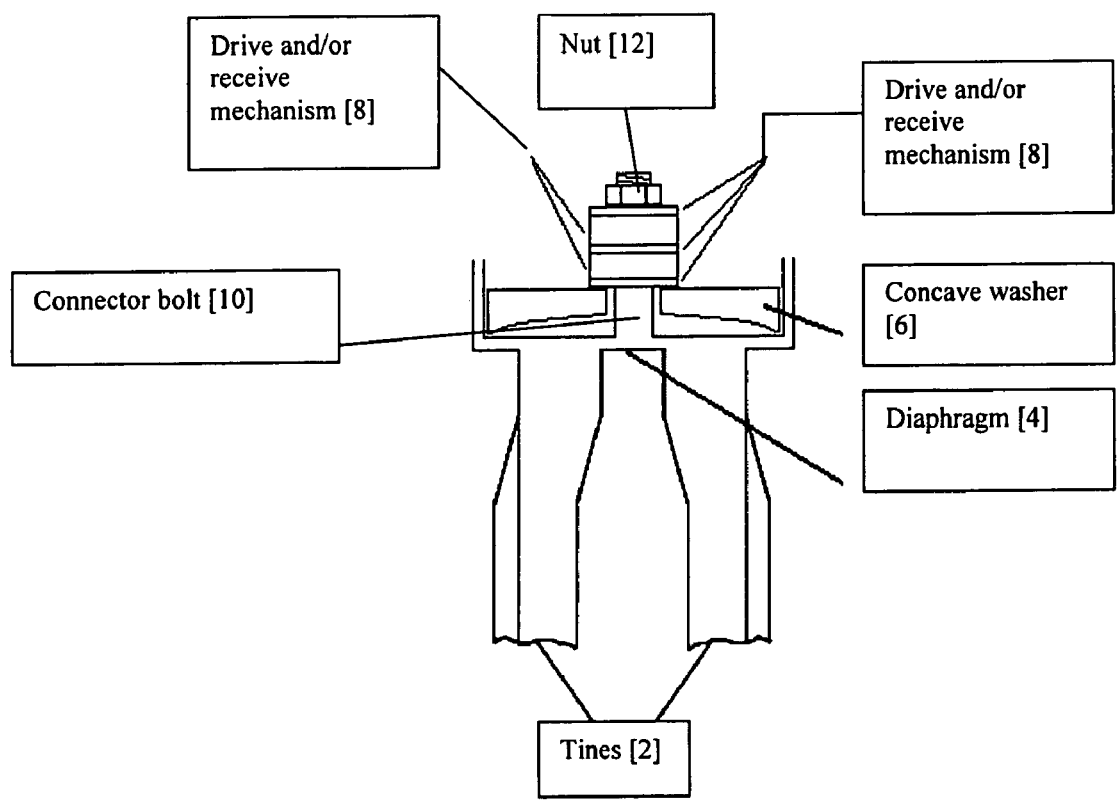
FIG. 1 shows the mechanical tuning fork part of the oscillator.

In the present invention, a coil is driven by an alternating current. The strength of the generated magnetic field is related to the current and other geometric parameters associated with the coil driving the system. The well-known Biot-Savart Law from physics establishes this relationship regarding magnetic field generation. When used as an electric current generator, the signal results from a time varying magnetic field produced by relative motion between the magnet and coil, which generates a current in the coil. The well-known Farady's Law of induction from physics establishes this relationship regarding electric field generation. To maximize oscillator output, the coil and mechanical oscillator must be driven at or near the resonance frequency of the mechanical oscillator. A circuit may be included that searches for the mechanical resonance frequency of the mechanical oscillator it is to drive.

The coil communicates, e.g. is coupled, to the system through a permanent magnet that, in a preferred embodiment, is attached to the oscillator. The magnetic force generated by the system is small, but since it is at or near resonance with the oscillator sufficient gain is experienced by the system to effectively drive the oscillator. Once in motion, the applied current to the coil can be stopped and the permanent magnet (now in motion) will generate a current in the coil that now operates as receiver that can be used to determine other parameters relevant to applications of interest, such as frequency and Q (quality factor related to damping), and, harmonics. The current commercial devices are driven with piezoelectric crystals which are less robust and have high temperature operating limits below those possible with a coil driven device.

The coil is a magnetic drive that generates a magnetic field that exerts a force on a permanent magnet attached to the mechanical oscillator. The forces generated by this method may be weaker than those possible from a piezoelectric drive, but when the mechanical system is driven at or near resonance, very little force is required to gain vibration amplitude because the force is synchronous with the motion. The currently employed circuits used with piezoelectric driven devices can be modified to a) supply a current instead of a voltage, b) search for the resonance frequency (as they currently do) and c) operate in a passive mode that can be used to provide a signal that can be analyzed for the sensor applications of interest in high temperature environments. In some configurations, the use of an inductive drive may provide a greater range of motion than available with the piezoceramic devices.

Detailed examples of the invention follow below. There are many geometric configurations that will enable communication between the coil, magnet, and the mechanical part of the tuning fork. For clarity, the external housing of the device is not shown. The external housing protects all of the components of the magnetic drive/receive mechanism from the environment. Moreover, a ferromagnetic external housing provides shielding from stray electromagnetic fields.

FIG. 1 shows the mechanics of the tuning fork including the tines [2], diaphragm [4], the drive and/or receive mechanism [8], the concave washer [6], and the connector [10]. Nut [12] attaches to the threaded end of the connector bolt [10]. The connector bolt [10] is essentially a bolt that, in general, may provide a rigid connection between the diaphragm [4] and either the coil or the magnet of the inductive driver/ receiver. The concave washer [6] provides a physical offset (gap) between drive/receive mechanism [8] and the diaphragm [4].

Figure 2:
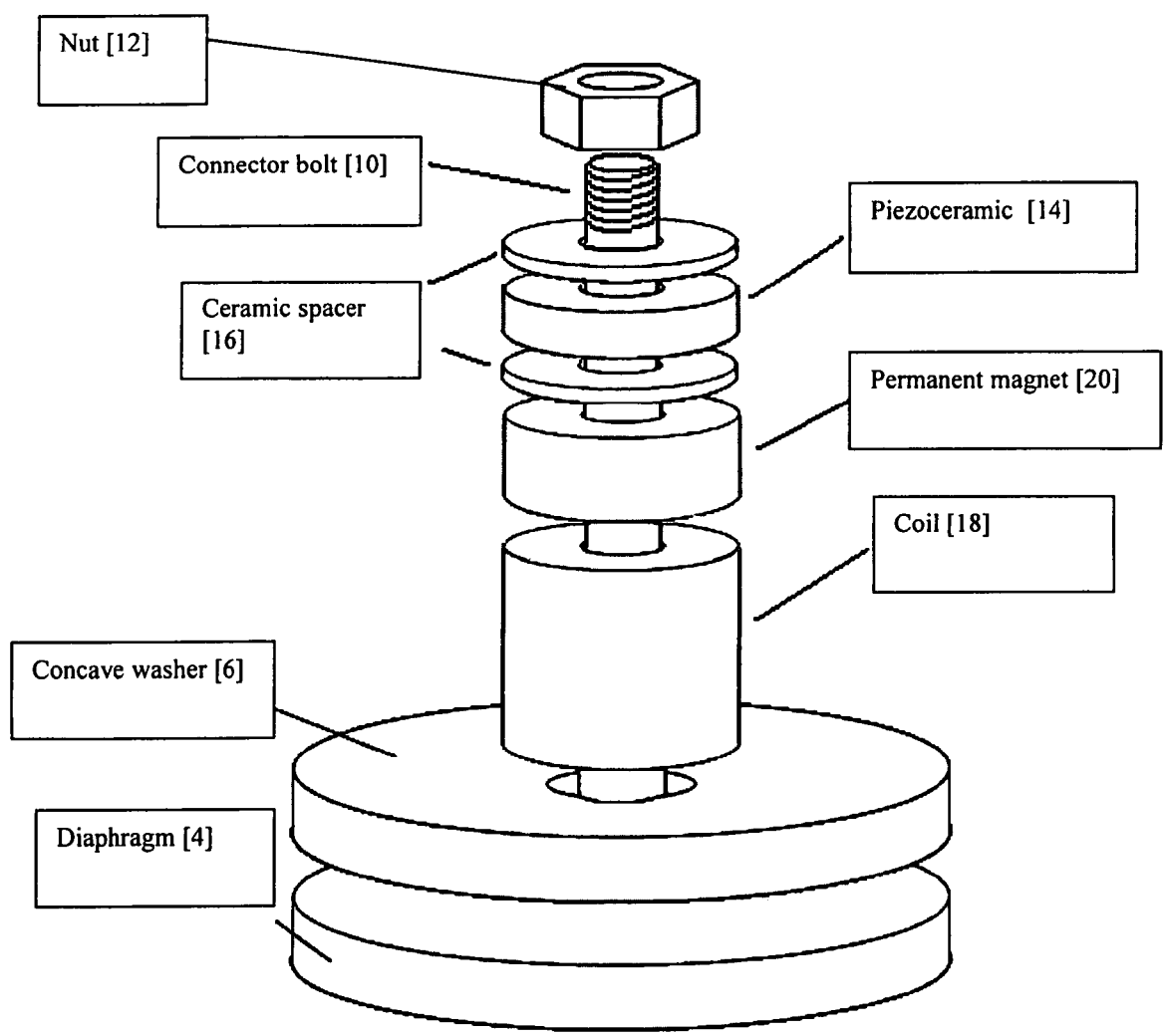
FIG. 2 shows an embodiment of the present invention

FIG. 2 shows an embodiment of the present invention which shows a view of the inductive driver/receiver. The elements of the inductive drive are the coil [18] and the permanent magnet [20]. In this embodiment, the connector [10] passes unobstructed through the coil [18] but is not affixed to said coil. Nut [12] is applied in a fashion to provide a compression force securing the ceramic spacers [16], optional piezoceramic [14], and permanent magnet [20]. The permanent magnet [20] is affixed to the connector [10], thereby providing the rigid connection to the diaphragm [4]. An optional piezoceramic device [14] may be included in the stack if it is desired to provide an independent means to monitor or drive the fork. The ceramic spacers [16] provide electrical isolation of the piezoceramic crystal [14]. The coil [18] is fixed to the concave washer [6] or secured using a structure not shown. The concave washer [6] moves independently of the diaphragm [4]. For clarity, the components in FIG. 2 between the concave washer [6] and the nut [12] are separated by spaces. For construction purposes, there are generally no spaces. The exception is that there is a space between coil [18] and permanent magnet [20]. That space facilitates the relative movement between the coil and magnet. Based on this arrangement, the diaphragm [4] and permanent magnet [20] can move freely with respect to coil [18]. An optional resilient spacer (not shown) can be physically employed to maintain that spacing.

Figure 3:
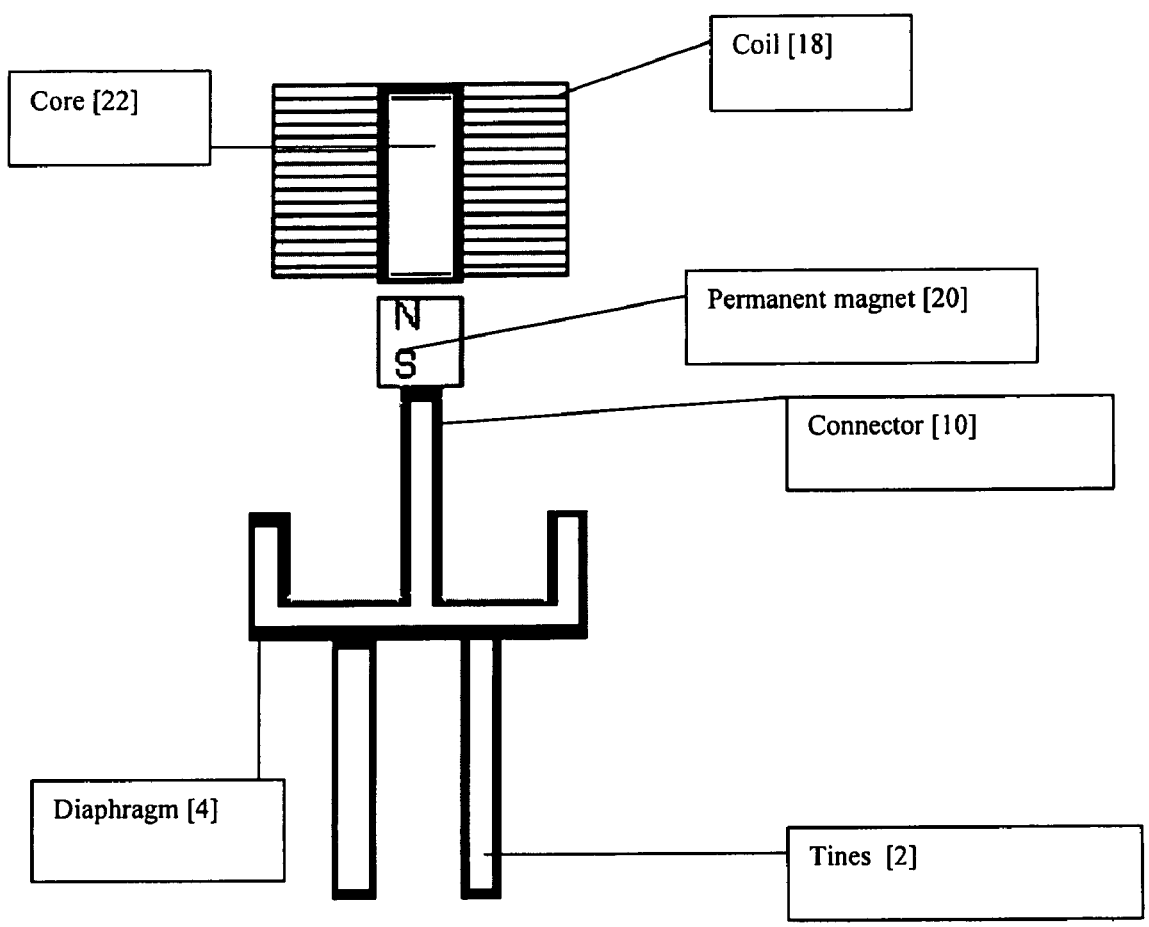
FIG. 3 shows a schematic diagram of a second embodiment of the present invention.

FIG. 3 is a schematic representation of another embodiment of the present invention. In this configuration a permanent magnet [20] is attached to a post/connector to the diaphragm [4] which connects to the tines [2]. An optional core [22] may be used in the coil [18] to enhance the magnetic field properties.

Figure 4:
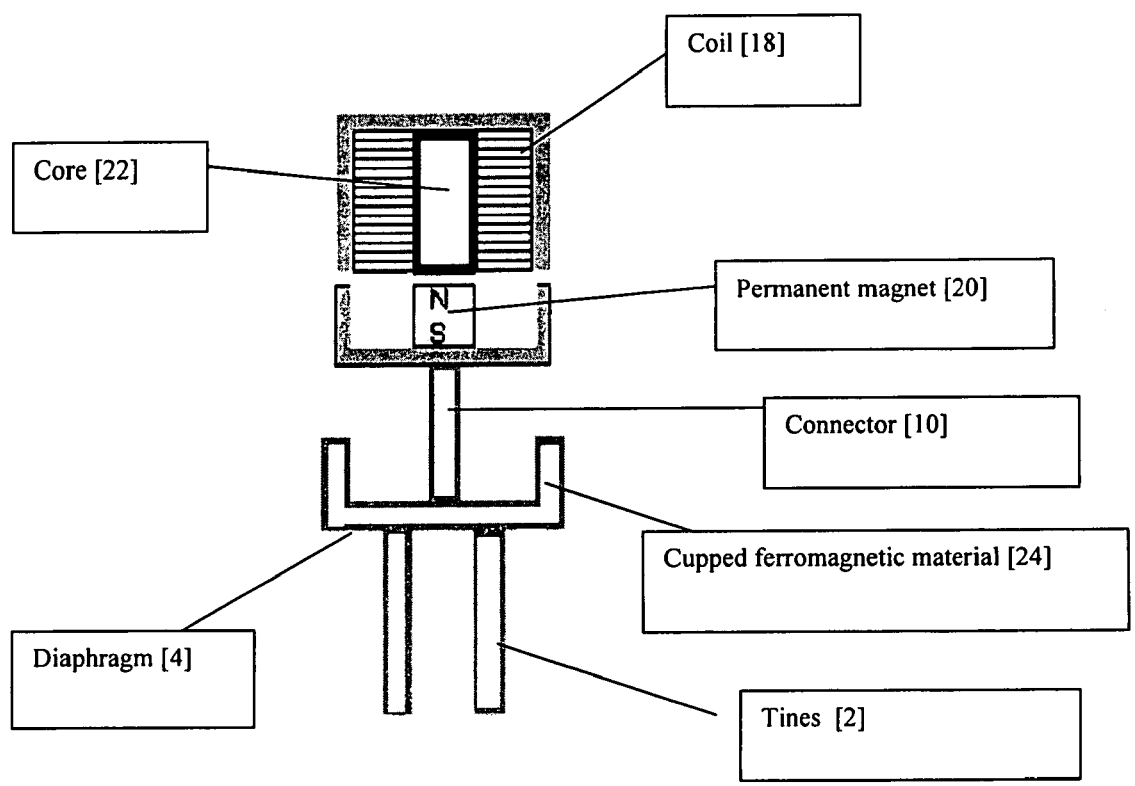
FIG. 4 shows a schematic diagram of a third embodiment of the present invention.

FIG. 4 is a schematic of another embodiment, similar to FIG. 3, but includes a cupped-shaped ferromagnetic backing material [24] surrounding the permanent magnet. This ferromagnetic backing improves the response by directing the magnetic field between the coil and the permanent magnet. All of the other parts remain the same.

Figure 5:
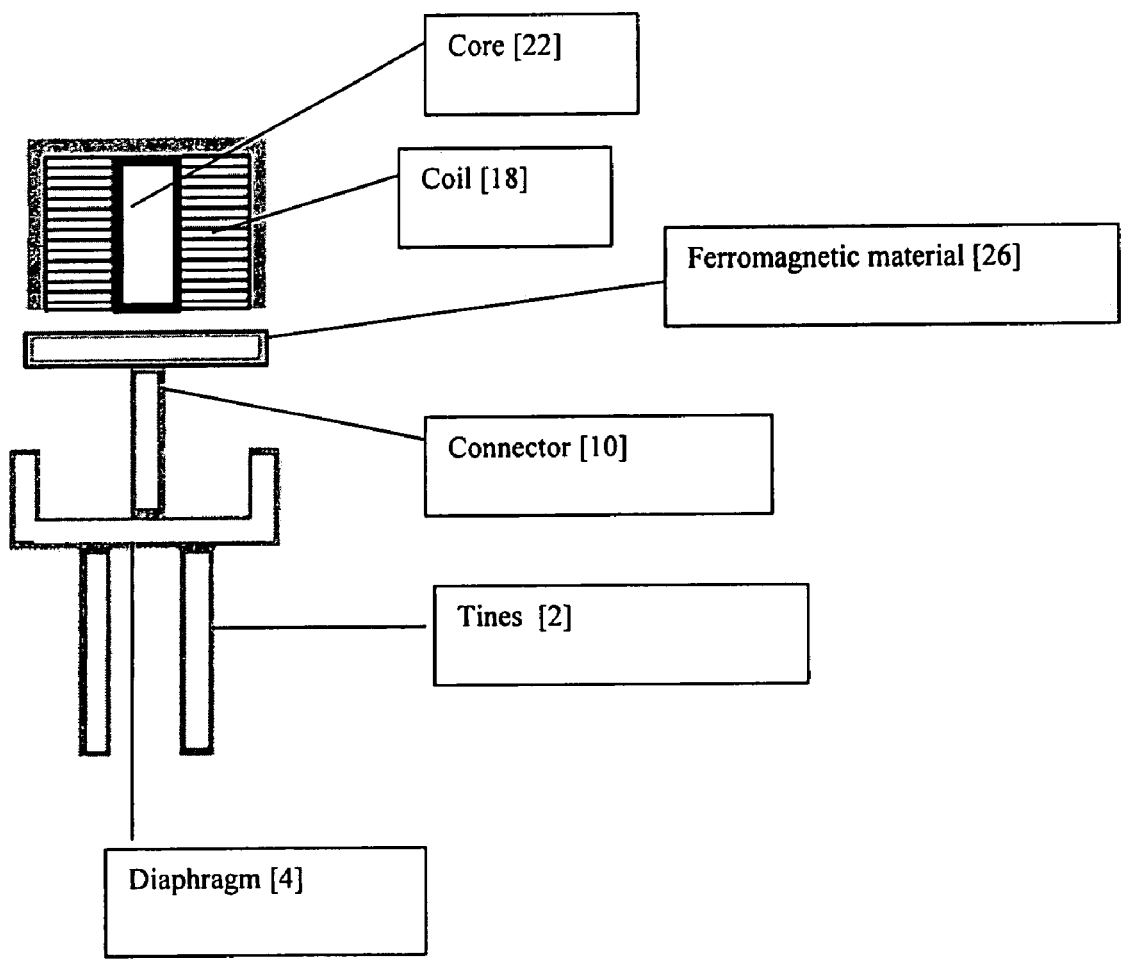
FIG. 5 shows a schematic diagram of a fourth embodiment of the present invention.

FIG. 5 shows a schematic embodiment where the permanent magnet [20] of FIG. 3 has been replaced with ferromagnetic material. All other parts remain the same. Although this configuration may be simpler to fabricate, it will have lower sensitivity compared to the FIG. 3 embodiment.

Figure 6:
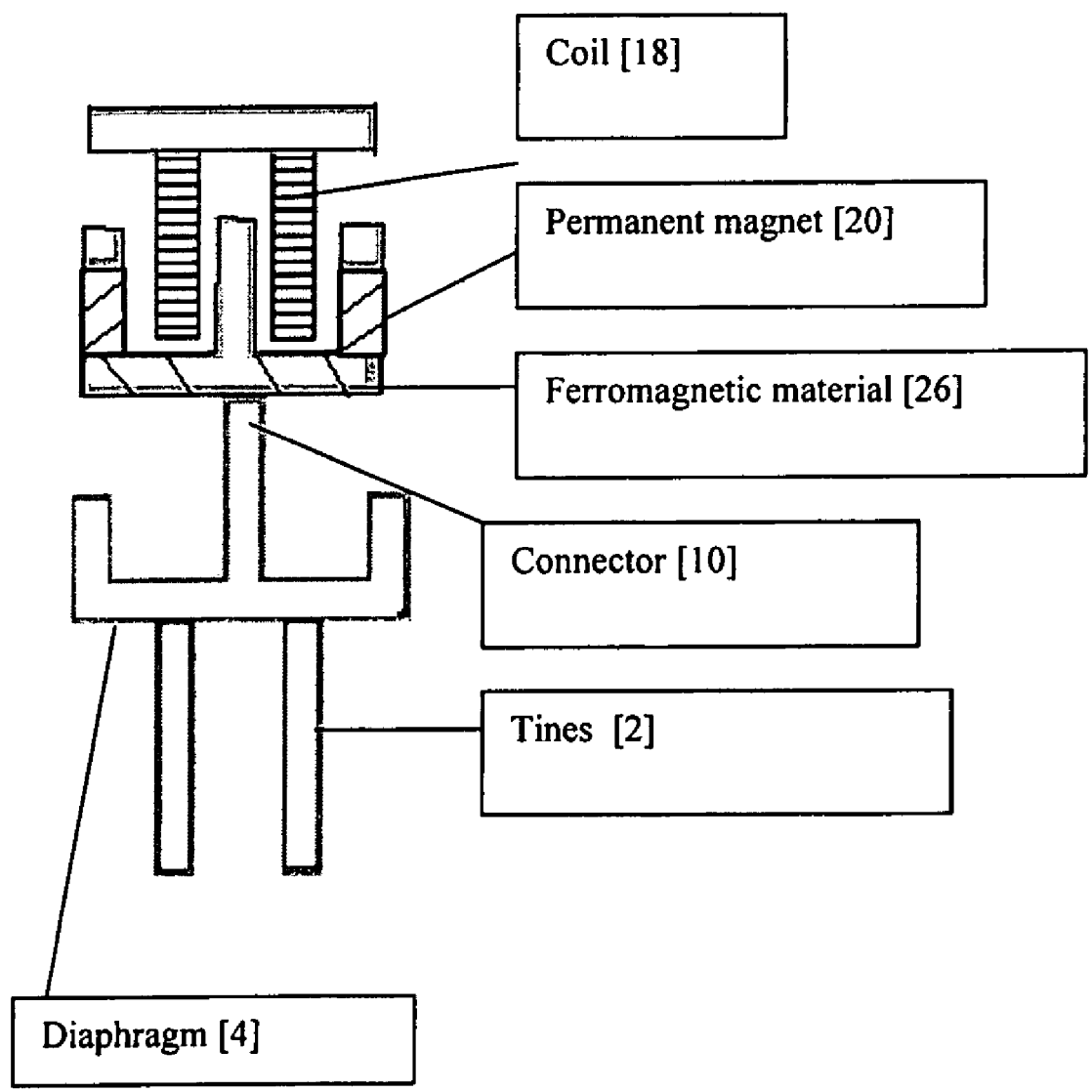
FIG. 6 shows a schematic diagram of a fifth embodiment of the present invention.

FIG. 6 shows a schematic embodiment that employs a hollow cylindrical permanent magnet [20] encircling coil [18] while ferromagnetic material [26] serves to direct the magnetic field. The ferromagnetic material also serves as the core of the coil. Connector [10] attaches ferromagnetic material [26] to diaphragm [4].

Figure 7:
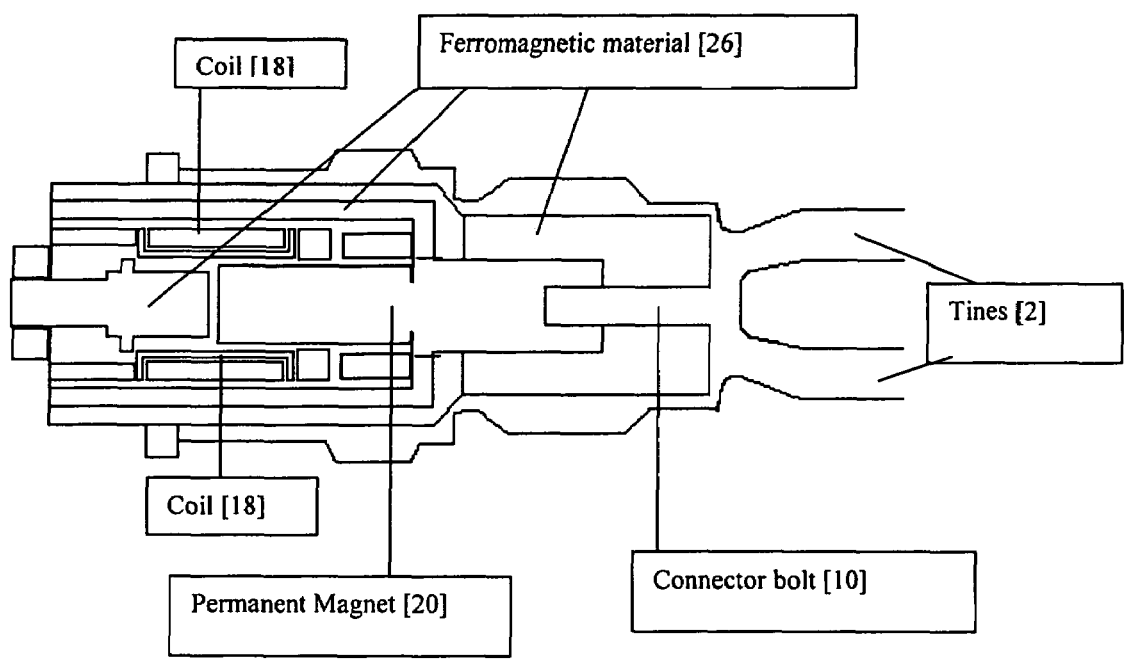
FIG. 7 shows an embodiment based on the schematic diagram of FIG. 4.

FIG. 7 shows an embodiment operable at least to 400° C. based on a schematic similar to that shown in FIG. 4. In this embodiment, permanent magnet [20] is inserted into the coil on the same axis as the coil [18]. The permanent magnet [20] is connected to the housing [28] which, in turn, connects to diaphragm [4] by the connector/bolt [10].

What is claimed is:

1. A magnetic drive and mechanical oscillator system comprising
   a) a mechanical oscillator
   b) a coil
   c) a means for providing alternating current to said coil thereby creating a magnetic field within and about the coil,
   d) a ferromagnetic material fixed to said mechanical oscillator in communication with the diaphragm of the oscillator and the coil.

2. The magnetic drive of claim 1 wherein the ferromagnetic material includes a permanent magnet.

3. The magnetic drive of claim 2 wherein the permanent magnet is located external to the coil.

4. The magnetic drive of claim 1 wherein the coil has a ferromagnetic core.

5. The magnetic drive of claim 2 wherein said permanent magnet is fixed to said mechanical oscillator.

6. The magnetic drive of claim 1 wherein the current to the coil has a frequency equal to the resonance frequency of the mechanical oscillator.

7. The magnetic drive of claim 1 wherein a circuit searches for the resonance frequency.

8. The magnetic drive of claim 1 wherein a circuit sweeps through the mechanical resonance to compute Q.

9. The magnetic drive of claim 2 wherein the permanent magnet is inserted in the coil along its axis.

10. The magnetic drive of claim 9 wherein said permanent magnet is partially inserted into the coil.

11. The magnetic drive of claim 2 wherein said permanent magnet is a cylindrically shaped enclosing the coil.

12. The magnetic drive of claim 1 wherein said ferromagnetic material is positioned to direct the magnetic field of the coil.

13. The magnetic drive of claim 2 wherein said ferromagnetic material directs the magnetic field of the permanent magnet.

* * * * *